United States Patent
Gallop et al.

(10) Patent No.: US 9,336,362 B2
(45) Date of Patent: May 10, 2016

(54) REMOTE INSTALLATION OF DIGITAL CONTENT

(71) Applicant: MICROSOFT TECHNOLOGY LICENSING, LLC, Redmond, WA (US)

(72) Inventors: Michael Gallop, Sammamish, WA (US); Frank R. Morrison, III, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 44 days.

(21) Appl. No.: 13/858,803

(22) Filed: Apr. 8, 2013

(65) Prior Publication Data

US 2014/0304838 A1 Oct. 9, 2014

(51) Int. Cl.
*G06F 21/10* (2013.01)
*H04L 29/06* (2006.01)

(52) U.S. Cl.
CPC ............... *G06F 21/10* (2013.01); *H04L 63/10* (2013.01); *H04L 2463/101* (2013.01)

(58) Field of Classification Search
CPC ................................ G06F 21/10; G06Q 30/06
See application file for complete search history.

(56) References Cited

U.S. PATENT DOCUMENTS

| 6,920,567 | B1 | 7/2005 | Doherty et al. | |
|---|---|---|---|---|
| 7,861,307 | B2 | 12/2010 | Dionne | |
| 2006/0206486 | A1* | 9/2006 | Strickland | 707/9 |
| 2008/0065552 | A1 | 3/2008 | Elazar et al. | |
| 2008/0178302 | A1* | 7/2008 | Brock et al. | 726/32 |
| 2010/0071070 | A1* | 3/2010 | Jawa et al. | 726/26 |
| 2010/0250454 | A1* | 9/2010 | Powell | 705/310 |
| 2010/0299425 | A1* | 11/2010 | Yamada | 709/223 |
| 2010/0325734 | A1* | 12/2010 | Etchegoyen | 726/26 |
| 2010/0332565 | A1* | 12/2010 | Al-Shaykh et al. | 707/912 |
| 2011/0035807 | A1* | 2/2011 | Alberth et al. | 726/27 |
| 2011/0162087 | A1* | 6/2011 | Lal et al. | 726/29 |

(Continued)

FOREIGN PATENT DOCUMENTS

| WO | 03005145 A2 | 1/2003 |
|---|---|---|
| WO | 2005060199 A1 | 6/2005 |
| WO | 2006080772 A1 | 8/2006 |

OTHER PUBLICATIONS

"Steams Latest Beta Client Enables Remote Installation of Games, with Emphasis on Beta", Retrieved at <<http:// beforeitsnews.com/science-and-technology/2012/05/steams-latest-beta-client-enables-remote-installation-of-games-with-emphasis-on-beta-2092027.html>>, May 3, 2012, pp. 5.

(Continued)

*Primary Examiner* — Izunna Okeke
*Assistant Examiner* — Cheng-Feng Huang
(74) *Attorney, Agent, or Firm* — Aaron Chatterjee; Judy Yee; Micky Minhas (57) ABSTRACT

Various embodiments relating to remote installation of digital content on unlicensed computing machines are provided. In one embodiment, an unlicensed computing machine at which to install a licensed digital content item is identified by a licensed computing machine, a request to transfer a license for the licensed digital content item to the unlicensed computing machine is sent from the licensed computing machine to an authorization service computing machine, and delivery of the licensed digital content item to the unlicensed computing machine is initiated.

19 Claims, 7 Drawing Sheets

(56) References Cited

U.S. PATENT DOCUMENTS

2011/0213721 A1* 9/2011 Raley et al. .................. 705/310
2012/0214451 A1 8/2012 Richardson et al.
2012/0291140 A1 11/2012 Robert et al.

OTHER PUBLICATIONS

"Install Remote Desktop Services Client Access Licenses", Retrieved at <<http://technet.microsoft.com/en-us/library/cc725890.aspx>>, Retrieved Date: Jan. 17, 2013, p. 1.

"Remotely Accessing your PC", Retrieved at <<http://www.micromart.co.uk/pc/138/remotely-accessing-your-pc>>, Retrieved Date: Jan. 17, 2013, pp. 5.

ISA European Patent Office, International Search Report & Written Opinion in PCT Patent Application No. PCT/US2014/033116, Jul. 11, 2014, WIPO, 11 Pages.

Conrado, et al., "Privacy-Preserving Digital Rights Management," In Book—Secure Data Management—Lecture Notes in Computer Science, A Springer Berlin Heidelberg Publication, vol. 3178, pp. 83-99, Aug. 2004, 17 pages.

IPEA European Patent Office, Second Written Opinion Issued in PCT Patent Application No. PCT/US2014/033116, Mar. 10, 2015, WIPO, 7 Pages.

IPEA European Patent Office, International Preliminary Report on Patentability Issued in Application No. PCT/US2014/033116, Jul. 15, 2015, WIPO, 8 Pages.

* cited by examiner

REMOTE INSTALLATION OF DIGITAL CONTENT

BACKGROUND

In some cases, a user who owns a digital content item may desire to consume the digital content item with another user who does not own the digital content item on that user's computing machine. In one example, the owner of a video game may desire to play the video game with a friend on the friend's game console. However, there may be some impediments to playing the video game on the friend's game console. For example, the owner of the video game may have to bring a physical copy of the video game, such as a game disc, to the friend's house to install the video game on the friend's game console. Then, the owner and the friend may have to wait for the video game to be installed on the friend's game console. Such wait time may discourage the users from playing the video game together.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to remote installation of digital content on unlicensed computing machines are provided. In one embodiment, a licensed computing machine identifies an unlicensed computing machine at which to install a licensed digital content item. The licensed computing machine sends to an authorization service computing machine a request to transfer a license for the licensed digital content item to the unlicensed computing machine. Then delivery of the licensed digital content item to the unlicensed computing machine is initiated.

DETAILED DESCRIPTION

The present disclosure describes concepts relating to directed remote installation of a licensed digital content item on an unlicensed computing machine. More particularly, the present disclosure provides mechanisms for identifying an unlicensed computing machine at which to remotely install a licensed digital content item, initiating delivery of the licensed digital content item to the unlicensed computing machine, and temporarily transferring a license for the licensed digital content item to the unlicensed computing machine. Such mechanisms may enable a user that owns a licensed digital content item to execute the licensed digital content item on an unlicensed computing machine without violating terms of the license. Moreover, such mechanisms may enable the licensed digital content item to be available for execution on the unlicensed computing machine when the user arrives at the unlicensed computing machine. In other words, with reference to the particular scenario described above, such mechanisms may enable the video game to be remotely installed on the friend's game console, so that the video game is available to be played when the owner arrives at the friend's house.

Figure 1:
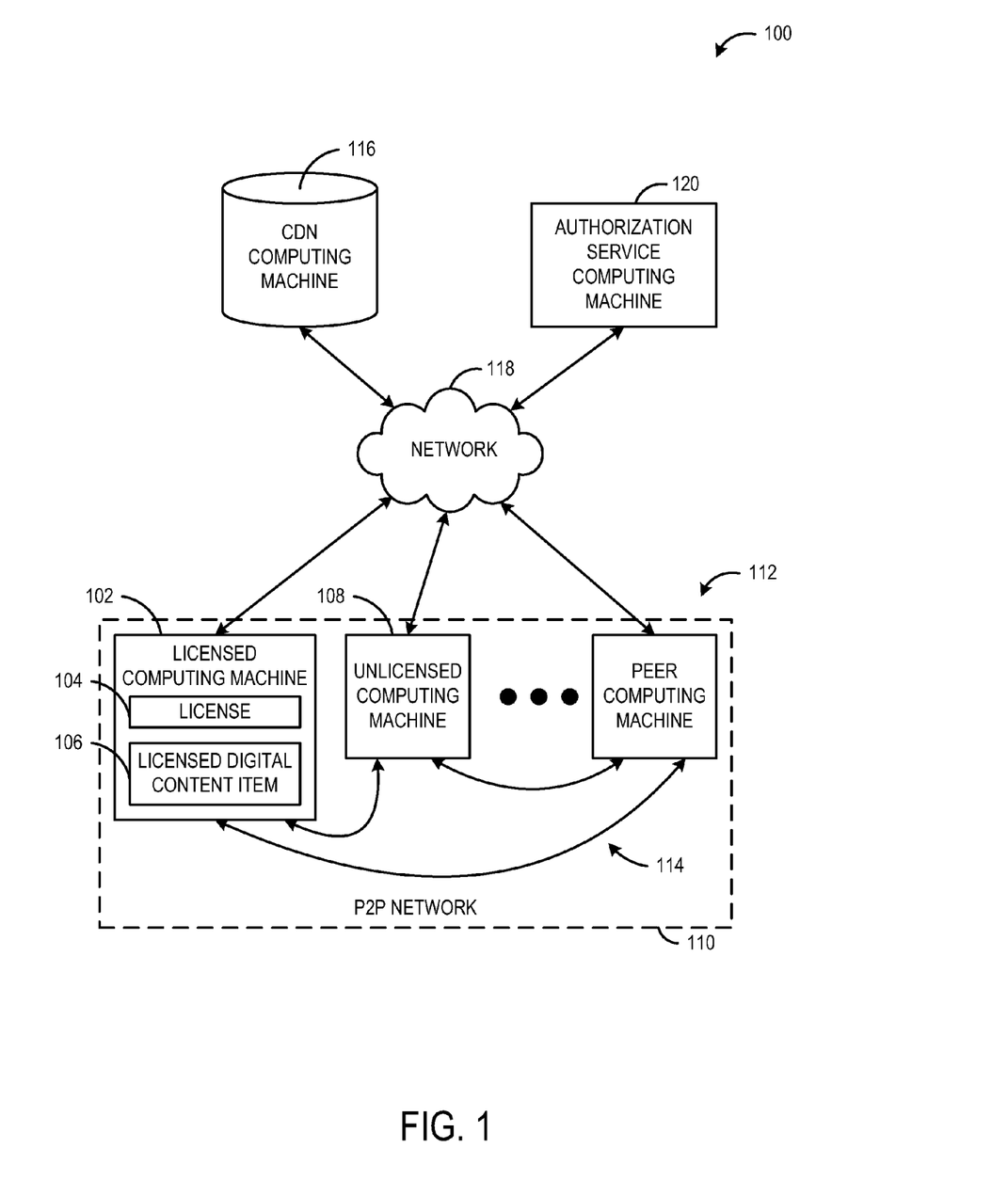
FIG. 1 schematically shows a computing system in accordance with an embodiment of the present disclosure.

FIG. 1 shows a computing system 100 in accordance with an embodiment of the present disclosure. The computing system 100 includes a licensed computing machine 102 that has a license 104 for a licensed digital content item 106. The licensed digital content item may be installed on the licensed computing machine for execution by a user associated with the licensed computing machine.

The license for the licensed digital content item may conform to any suitable licensing scheme. The digital content and the license may be cooperatively configured such that the digital content item is cryptographically prevented from executing absent a valid license. For example, the license may restrict or otherwise control access to the licensed digital content item to one or more users, groups, and/or computing machines as defined by the terms of the license. In some cases, the license may be associated with the licensed computing machine, a user associated with the licensed computing machine (e.g., the owner), or a combination thereof. In some embodiments, the license may be a permanent license that is associated with the licensed computing machine unless the license is temporarily transferred to an unlicensed computing machine. For example, the licensed computing machine may own the license and the license may be temporarily lent to the unlicensed computing machine. In some embodiments, the license may restrict the licensed digital content item to mutually exclusive execution. In other words, the licensed digital content item may be executed on one computing machine at a time.

The computing system includes an unlicensed computing machine 108 that does not have a license for the licensed digital content item. Further, a user associated with the unlicensed computing machine does not have a license for the licensed digital content item. In some embodiments, the unlicensed computing machine may not execute the licensed digital content item without a license for the licensed digital content item. As described by way of example below, the unlicensed computing system may be remotely located relative to the licensed computing machine.

The licensed computing machine and the unlicensed computing machine may be included in a peer-to-peer (P2P) network 110. The P2P network may include a plurality of peer computing machines (e.g., licensed computing machine, unlicensed computing machine, peer computing machine, etc.) 112. Each peer computing machine of the P2P network may be configured to communicate directly with each other peer computing machine of the P2P network via one or more network connections 114 and/or networks 118. More particularly, each peer computer may act as a client and/or a server to the other peer computers of the P2P network, allowing for shared access to various local resources of each peer computer. Although it will be appreciated that any suitable resource may be delivered or shared between peer computers of the P2P network, in the context of this description, discussion may be particularly directed to delivering digital content items. For example, the licensed computing machine may deliver the licensed digital content item to the unlicensed computing machine via the P2P network. As another example, one or more peer computing machines may deliver at least a portion of the licensed digital content item to the unlicensed computing machine.

In some embodiments, the computing system 100 may include a content-delivery network (CDN) computing machine 116 that may act as a source for digital content items. The CDN may deliver digital content items to the plurality of peer computing machines via a network 118, such as the Internet. In some cases, the CDN may be configured to store some or all of the digital content items available for delivery on peer computing machines of the P2P network. In other words, the CDN may act as a mirror or backup to the P2P network. In some cases, the CDN may be a source of digital content items that are not yet available for transfer on the P2P network. In some embodiments, the P2P network may be omitted from the computing system and the CDN may be a source of digital content items. In any of these scenarios, the CDN may deliver the licensed digital content item to the unlicensed computing machine.

The computing system 100 may include an authorization service computing machine 120 that may protect against unauthorized use of licensed digital content items by computing machines of the computing system. In other words, the authorization service may facilitate delivery of licenses to licensed computing machines (e.g., allow a computing device to cryptographically access the licensed digital content item). Moreover, the authorization service may be configured to facilitate temporary transfer of a license from a licensed computing machine to an unlicensed computing machine, so that the unlicensed computing machine may execute the licensed digital content item on a temporary basis (e.g., the authorization service changes which computing machine is allowed to cryptographically access the licensed digital content item). In particular, the authorization service may be configured to determine whether a computing machine has an entitlement to execute a digital content item. For example, a computing machine may be entitled to execute a licensed digital content item if the computing machine (and/or an associated user) has a license for the digital content item, and the authorization service may be configured to determine whether a computing machine has a license. If the licensed computing machine has the license, then the authorization service may approve temporary transfer of the license to the unlicensed computing machine.

In cases where a license restricts execution of the licensed digital content item to one computing machine at a time, the authorization service may be configured to determine whether a licensed digital content item is currently being executed on a licensed computing machine. If the licensed digital content item is not being executed on the licensed computing machine, the authorization service may be configured to approve transfer of the license to the unlicensed computing machine. If the licensed digital content item is being executed on a licensed computing machine, the authorization service may be configured to invalidate transfer of the license. In one example, this check may be performed when the unlicensed computing machine attempts to execute the licensed digital content item. Note, in some cases, the check need not be performed when the licensed computing machine initiates transfer of the license to the unlicensed computing machine. In some embodiments, the licensed computing machine may be prevented from executing the licensed digital content item while the license is transferred to the unlicensed computing machine.

The license may be temporarily transferred from the licensed computing machine to the unlicensed computing machine for any suitable duration or in any suitable manner. In one example, the license is transferred to the unlicensed computing machine for a designated period and upon expiration of the designated period the license is transferred back to the licensed computing machine. In another example, the license is transferred to the unlicensed computing machine when a user associated with the licensed computing machine signs in to the unlicensed computing machine and the licensed is transferred back to the licensed computing machine when the user signs out of the unlicensed computing machine. Alternatively or additionally, the license may be temporarily transferred to a user or a group.

In some cases, the license may allow the licensed digital content item to be executed without validation of the transfer by the authorization service. In some cases, the unlicensed computing machine may be configured to prevent execution of the licensed digital content item on the unlicensed computing machine if the license for the licensed digital content item is not validated as being transferred to the unlicensed computing machine by the authorization service.

Accordingly, the authorization service may be configured to validate transfer of the license for the licensed digital content item to the unlicensed computing machine that allows execution of the licensed digital content item on the unlicensed computing machine. In particular, the authorization service may be configured to receive, from the unlicensed computing machine, a request to validate transfer of the license for the licensed digital content item to the unlicensed computing machine. The request may include credentials of the user associated with the licensed computing machine. The authorization service may be configured to validate transfer of the license to the unlicensed computing machine that allows execution of the licensed digital content item on the unlicensed computing machine if the credentials of the user are valid. In one example, the authorization service may send a license key to the unlicensed computing machine that allows execution of the licensed digital content item. On the other hand, the authorization service may be configured to invalidate transfer of the license to the unlicensed computing machine if the credentials of the user are invalid.

In some cases where the license restricts execution of the licensed digital content item to one computing machine, the authorization service may be configured to invalidate transfer of the license if the licensed digital content item is being executed on the licensed computing machine.

In some embodiments, the computing system may include different services to handle different requests and/or perform different operations. For example, a licensing service may determine whether a computing machine has a license for a licensed digital content item and an authorization service may determine whether a licensed computing machine may transfer a license to an unlicensed computing machine that allows the licensed computing machine to execute the licensed digital content item. In some embodiments, the above described operations may be performed by the same service.

Although the above described scenario is discussed in terms of a user initiating delivery of a licensed digital content item from the licensed computing machine to the unlicensed computing machine, it is to be understood that, in some cases, the user may initiate delivery of the licensed digital content item from the unlicensed computing machine. For example, a user may sign-in on an unlicensed computing machine, send, to the authorization service, a request to transfer the license for the licensed digital content item to the unlicensed computing machine, and initiate delivery of the licensed digital content item to the unlicensed computing machine. Sending the request from the unlicensed computing machine may not affect the operation of the authorization service. For example, the authorization may still determine the entitlement based on the credentials of the user.

Furthermore, while the above described scenario is discussed in terms of a video games being remotely installed on a game console, it is to be understood that the licensed digital content item may be realized in any suitable form, such as music, videos, e-books, applications, etc. Furthermore, the licensed digital content item may be purchased, leased, rented, or provided gratis to the licensed computing machine without departing from the scope of this disclosure.

Figure 2:
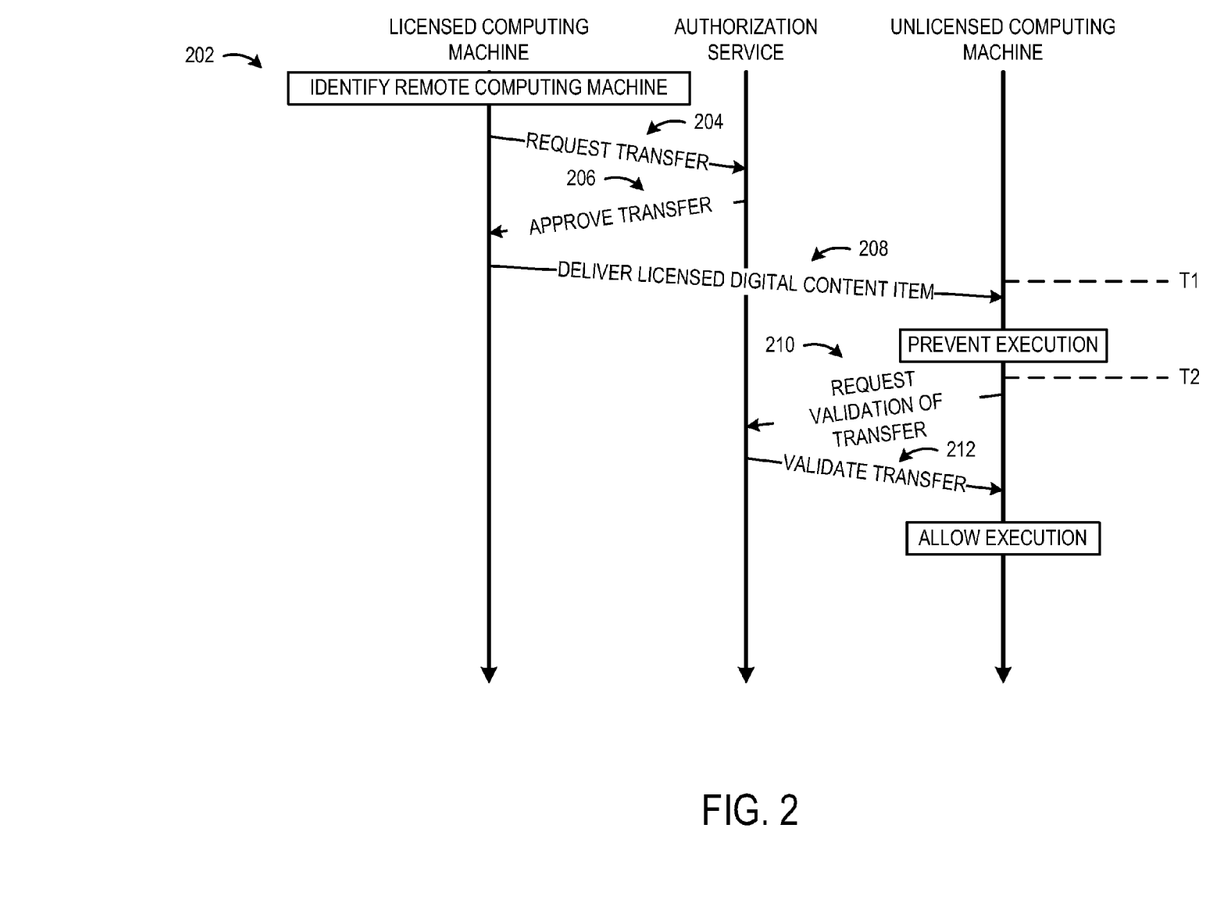
FIG. 2 shows an example of remotely installing a licensed digital content item on an unlicensed computing machine.
Figure 3:
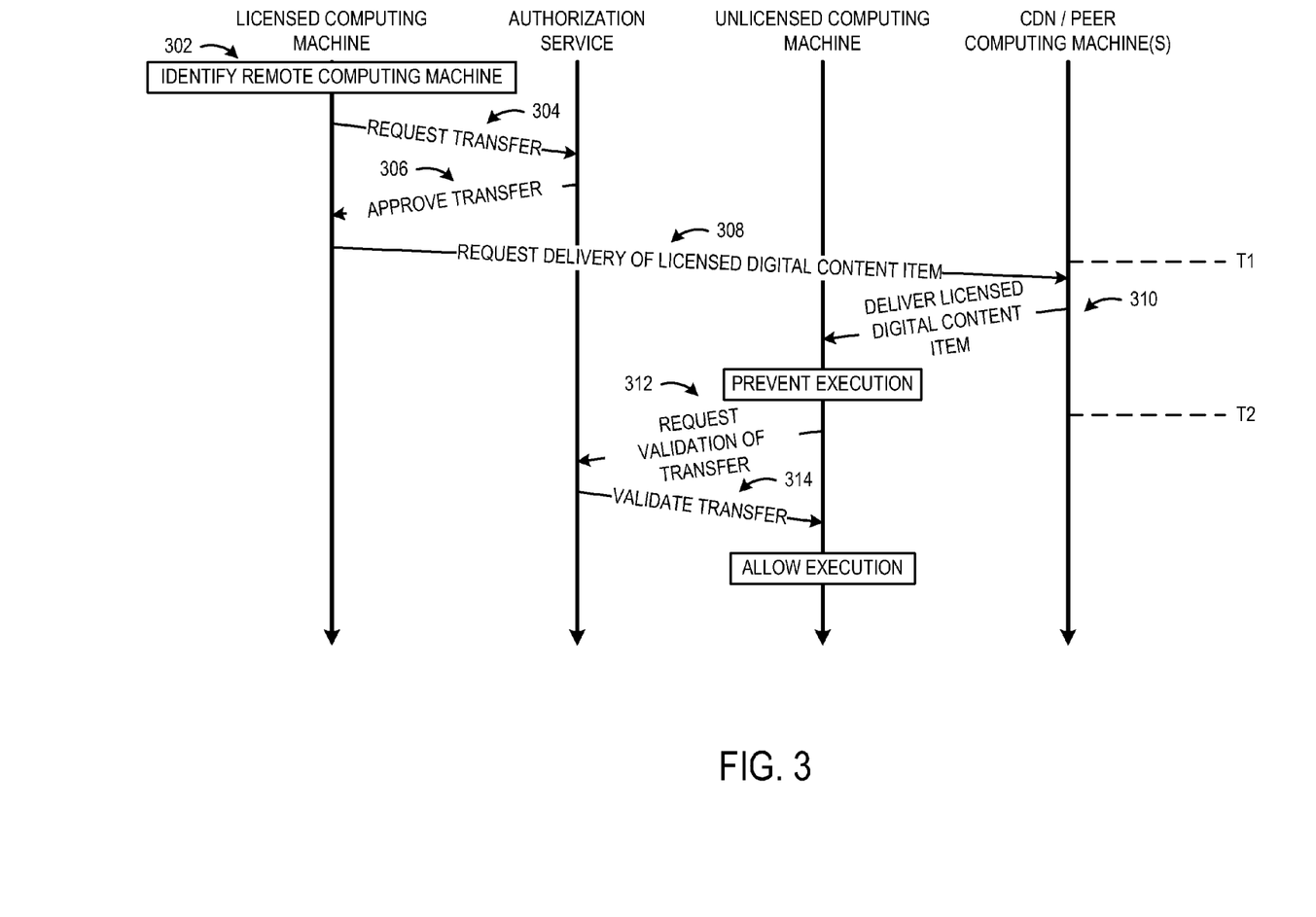
FIG. 3 shows another example of remotely installing a licensed digital content item on an unlicensed computing machine.

FIGS. 2 and 3 show different examples of remotely installing a licensed digital content item on an unlicensed computing machine. In FIG. 2, the licensed digital content item is delivered directly from a licensed computing machine to the unlicensed computing machine.

At 202, the licensed computing machine identifies the unlicensed computing machine. For example, a user may identify a social media friend from the licensed computing machine, and the unlicensed computing machine may be the computing machine associated with the social media friend's social media account. At 204, the licensed computing machine sends, to the authorization service computing machine, a request to temporarily transfer the license for the licensed digital content item to the unlicensed computing machine. At 206, the authorization service computing machine sends, to the licensed computing machine, approval of the request to transfer the license to the unlicensed computing machine. At 208, the licensed computing machine optionally delivers the licensed digital content item to the unlicensed computing machine. In some embodiments, the licensed computing machine may deliver the licensed digital content item without requesting permission to transfer the licensed digital content item and/or before receiving approval to transfer the license. Further, the unlicensed computing machine may obtain the licensed digital content item via any mechanism without departing from the scope of this disclosure. The license transfer mechanisms described herein are applicable regardless of the content delivery mechanism.

Once delivery of the licensed digital content item to the unlicensed computing machine is initiated, at time T1, the user may travel from the licensed computing machine to the unlicensed computing machine (e.g., the user may go to the friend's house). At time T2, the user may arrive at the unlicensed computing machine. In between time T1 and time T2, the licensed digital content item may be delivered and installed on the unlicensed computing machine. Furthermore, execution of the licensed digital content item on the unlicensed computing machine may be prevented before the license for the licensed digital content item is validated as being transferred to the unlicensed computing machine.

At 210, the unlicensed computing machine sends, to the authorization service computing machine, a request to validate transfer of the license for the licensed digital content item to the unlicensed computing machine. The request may include credentials of the user (i.e., the licensed user associated with the licensed computing machine). In one example, the request is sent responsive to the user signing in on the unlicensed computing machine. At 212, the authorization service computing machine validates the credentials and sends, to the unlicensed computing machine, validation of the transfer of the license to the unlicensed computing machine that allows execution of the licensed digital content item on the unlicensed computing machine. For example, the authorization service may send and/or otherwise enable a temporary license key to/for the unlicensed computing machine.

FIG. 3 shows another example of transferring a license for a licensed digital content item between computing machines. In FIG. 3, the licensed digital content item is delivered from the CDN and/or peer computing machines of the P2P network to the unlicensed computing machine.

At 302, the licensed computing machine identifies the unlicensed computing machine. At 304, the licensed computing machine sends, to the authorization service computing machine, a request to temporarily transfer the license for the licensed digital content item to the unlicensed computing machine. At 306, the authorization service computing machine sends, to the licensed computing machine, approval of the request to transfer the license to the unlicensed computing machine.

At 308, the licensed computing machine sends, to the CDN, one or more peer computing machines of the P2P network, or a combination thereof, a request to deliver the licensed content item to the unlicensed computing machine. At 310, the CDN and/or one or more of the peer computing machines delivers the licensed digital content item to the unlicensed computing machine. In some cases, the entire licensed digital content item may be delivered from a single source. In other cases, a plurality of different sources may each provide a portion of the licensed digital content item, such that the unlicensed computing machine receives an entirety of the licensed digital content item.

Once delivery of the licensed digital content item to the unlicensed computing machine is initiated, at time T1, the user may travel from the licensed computing machine to the unlicensed computing machine (e.g., the user may go to the friend's house). At time T2, the user may arrive at the unlicensed computing machine. In between time T1 and time T2, the licensed digital content item may be delivered and installed on the unlicensed computing machine. Furthermore, execution of the licensed digital content item on the unlicensed computing machine may be prevented before the license for the licensed digital content item is validated as being transferred to the unlicensed computing machine.

At 312, the unlicensed computing machine sends, to the authorization service computing machine, a request to validate transfer of the license for the licensed digital content item to the unlicensed computing machine. The request may include credentials of the user. At 314, the authorization service computing machine validates the credentials and sends, to the unlicensed computing machine, validation of the transfer of the license to the unlicensed computing machine that allows execution of the licensed digital content item on the unlicensed computing machine.

Figure 4:
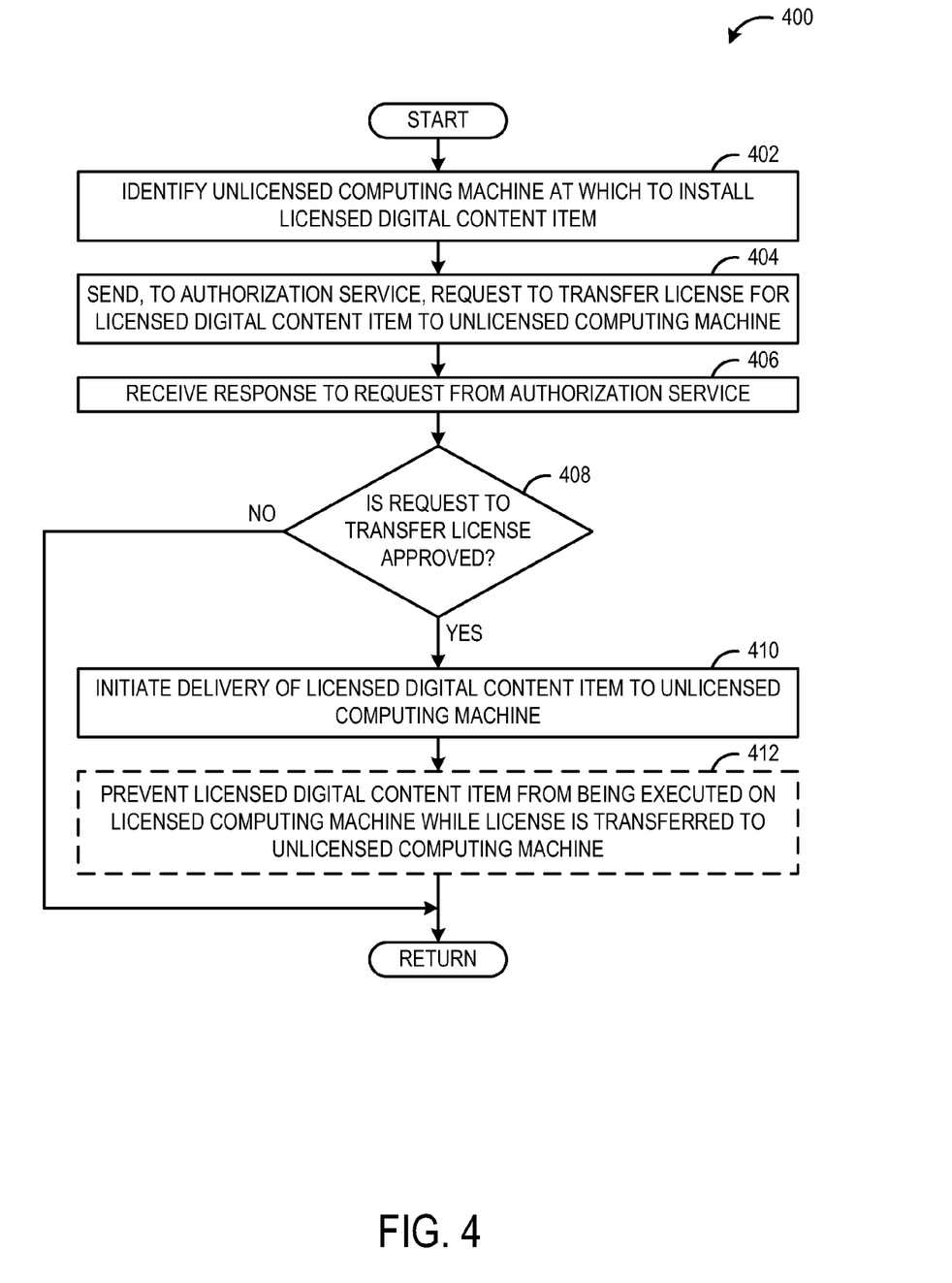
FIG. 4 shows a method of initiating remote installation of a licensed digital content item in accordance with an embodiment of the present disclosure.

FIG. 4 shows a method 400 of initiating remote installation of a licensed digital content item in accordance with an embodiment of the present disclosure. For example, the method 400 may be performed by the licensed computing machine 102 shown in FIG. 1.

At 402, the method 400 may include identifying an unlicensed computing machine at which to install a licensed digital content item. The unlicensed computing machine may be identified in any suitable manner. For example, identifying may include selecting an unlicensed computing machine from a set of known computing machines. In another example, identifying may include selecting an unlicensed computing machine by proxy through selecting a user as a remote install destination. In yet another example, identifying may include selecting a user as a remote install destination where a user may have an associated default unlicensed computing machine. In yet another example, identifying may include selecting a user as a remote install destination where the unlicensed computing machine is the computing machine at which the user is currently signed into. All of the above mechanisms may leverage previously established relationships, such as previously verified social media friendships/contacts.

In one particular example, the licensed computing machine may be associated with a user, and the user may identify the unlicensed computing machine from a plurality of unlicensed computing machines that are associated with different social media friends of the user. Specifically, the user may select a friend or an unlicensed computing machine associated with the friend (e.g., a default computing machine or a computing machine on which the friend is currently signed in) at which to install the licensed digital content item.

At 404, the method 400 may include sending, from the licensed computing machine to an authorization service computing machine, a request to transfer a license for the licensed digital content item to the unlicensed computing machine. The request may be made to reduce the possibility of unauthorized use of the licensed digital content item that may violate terms of the license.

At 406, the method 400 may include receiving a response to the request from the authorization service computing machine.

At 408, the method 400 may include determining whether the response to the request approves transfer of the license for the licensed digital content item to the unlicensed computing machine. If transfer of the license for the licensed digital content item to the unlicensed computing machine is approved, then the method 400 moves to 410. Otherwise, the method 400 returns to other operations.

At 410, the method 400 may optionally include initiating delivery of the licensed digital content item to the unlicensed computing machine. The delivery may be initiated responsive to receiving, from the authorization service computing machine, approval of the request to transfer the license for the licensed digital content item to the unlicensed computing machine. Delivery of the licensed digital content item may be initiated in any suitable manner.

In some embodiments where the terms of the license restrict execution of the licensed digital content item to one computing machine at a time, at 412, the method 400 may optionally include preventing the licensed digital content item from being executed on the licensed computing machine before the license is transferred to the unlicensed computing machine.

Figure 5:
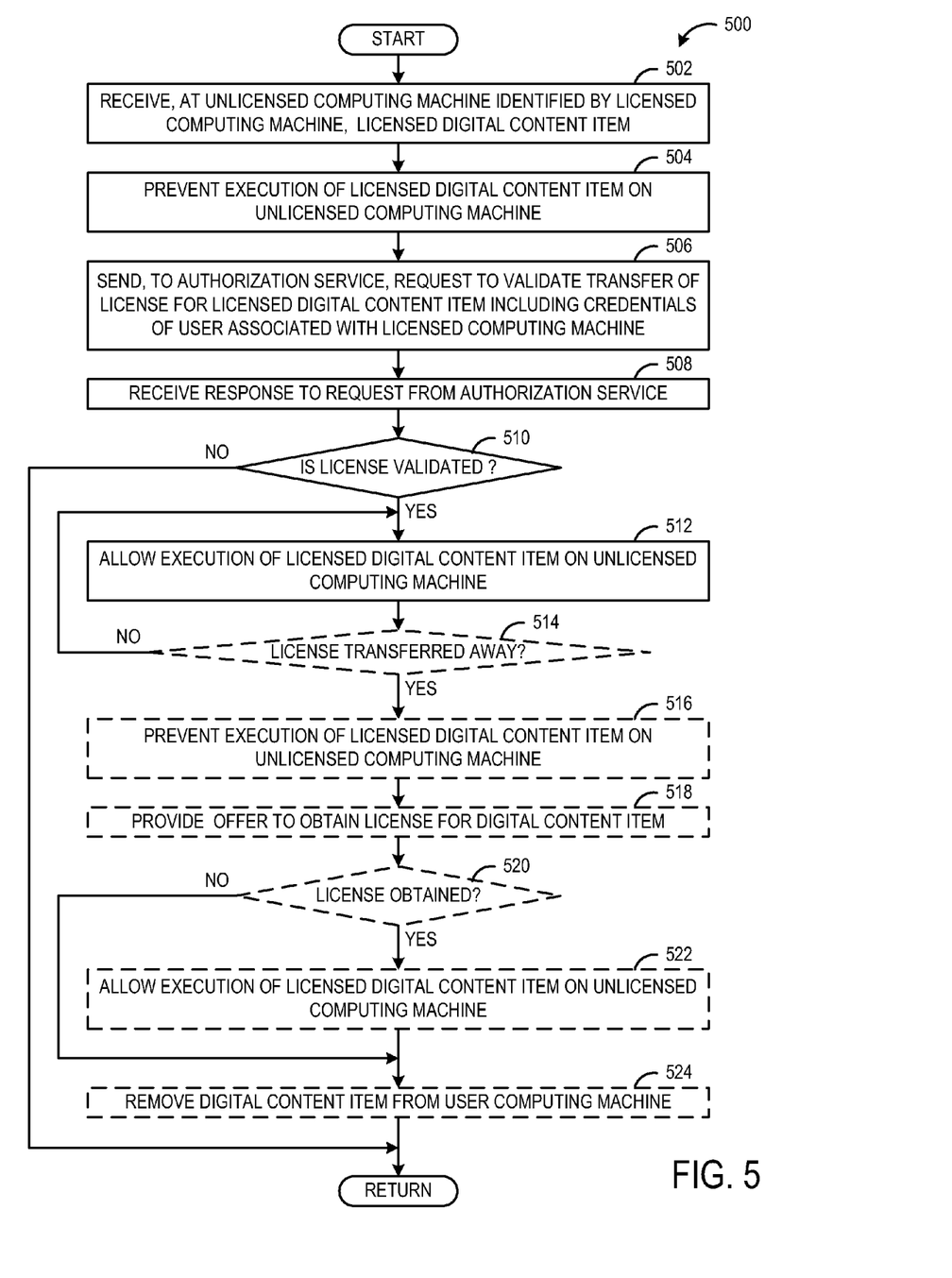
FIG. 5 shows a method of acquiring a licensed digital content item in accordance with an embodiment of the present disclosure.

FIG. 5 shows a method 500 of acquiring a licensed digital content item in accordance with an embodiment of the present disclosure. For example, the method 500 may be performed by the unlicensed computing machine 108 shown in FIG. 1.

At 502, the method 500 may include receiving, at an unlicensed computing machine identified by a licensed computing machine, a licensed digital content item. The licensed digital content item may be received from any suitable source. For example, the licensed digital content item may be received from the licensed computing machine, a CDN, a peer computer of a peer-to-peer network, or a combination thereof. In some embodiments, receiving may include installing the licensed digital content item on the unlicensed computing machine.

At 504, the method 500 may include preventing execution of the licensed digital content item on the unlicensed computing machine. Execution of the licensed digital content item on the unlicensed computing machine may be prevented if a license for the licensed digital content item is not validated as being transferred to the unlicensed computing machine. In some embodiments, preventing execution includes preventing execution of the entire licensed digital content item. In some embodiments, preventing execution includes preventing execution of a portion of the licensed digital content item. For example, a partial trial version of the licensed digital content item may be executed on the unlicensed computing machine before the license is validated as being transferred to the unlicensed computing machine.

At 506, the method 500 may include sending, to an authorization service computing machine, a request to validate the license for the licensed digital content item as being transferred to the unlicensed computing machine. The request may include credentials of a user associated with the licensed computing machine. The request may be sent responsive to the user signing in to the unlicensed computing machine.

At 508, the method 500 may include receiving a response to the request from the authorization service computing machine.

At 510, the method 500 may include determining whether the response validates the license as being transferred to the unlicensed computing machine. If the license for the licensed digital content item is validated as being transferred to the unlicensed computing machine, then the method 510 moves to 512. Otherwise, the method 500 returns to other operations.

At 512, the method 500 may include allowing execution of the licensed digital content item on the unlicensed computing machine.

At 514, the method 500 may optionally include determining whether the license for the licensed digital content item is transferred from the unlicensed computing machine. The license may be transferred from the unlicensed computing machine for any suitable reason. For example, a user may only authorize transfer of the license for one day, and at the end of that day, the license may return to the originally licensed computing machine. If the license remains with the previously unlicensed, now temporarily licensed, computing machine, method 500 returns to 512. If the license is transferred away, method 500 may proceed to 516.

At 516, the method 500 may optionally include preventing execution of the licensed digital content item on the unlicensed computing machine when the licensed is transferred away from the unlicensed computing machine. In one example, the licensed digital content item may revert to a partial trial version.

At 518, the method 500 may optionally include providing an offer to obtain a license for the licensed digital content item. For example, this offered license may be a new or permanent license associated with the unlicensed computing machine (to permanently convert that machine into a licensed computing machine). In some embodiments, the offer may include an incentive to obtain the license. For example, the incentive may be a reduced purchase price for the license.

At 520, the method 500 may optionally include determining whether the unlicensed computing machine has obtained a license for the licensed digital content item. If the unlicensed computing machine has obtained the license, then the method 500 moves to 522. Otherwise, the method 500 moves to 524.

At 522, the method 500 may optionally include allowing execution of the licensed digital content item on the unlicensed computing machine responsive to the unlicensed computing machine obtaining the license for the licensed digital content item.

At 524, the method 500 may optionally include removing the licensed digital content item from the unlicensed computing machine if resources of a visitor cache of the unlicensed computing machine become designated for a different digital content item. For example, the unlicensed computing machine may include an automatically managed visitor cache that includes storage for digital content items to which the unlicensed computing machine does not have a license, such as digital content items temporarily transferred by other licensed computing machines. In some embodiments, the unlicensed computing machine may not include an automatically managed visitor cache and the licensed digital content may remain on the unlicensed computing machine until the user manually removes the licensed content item.

Figure 6:
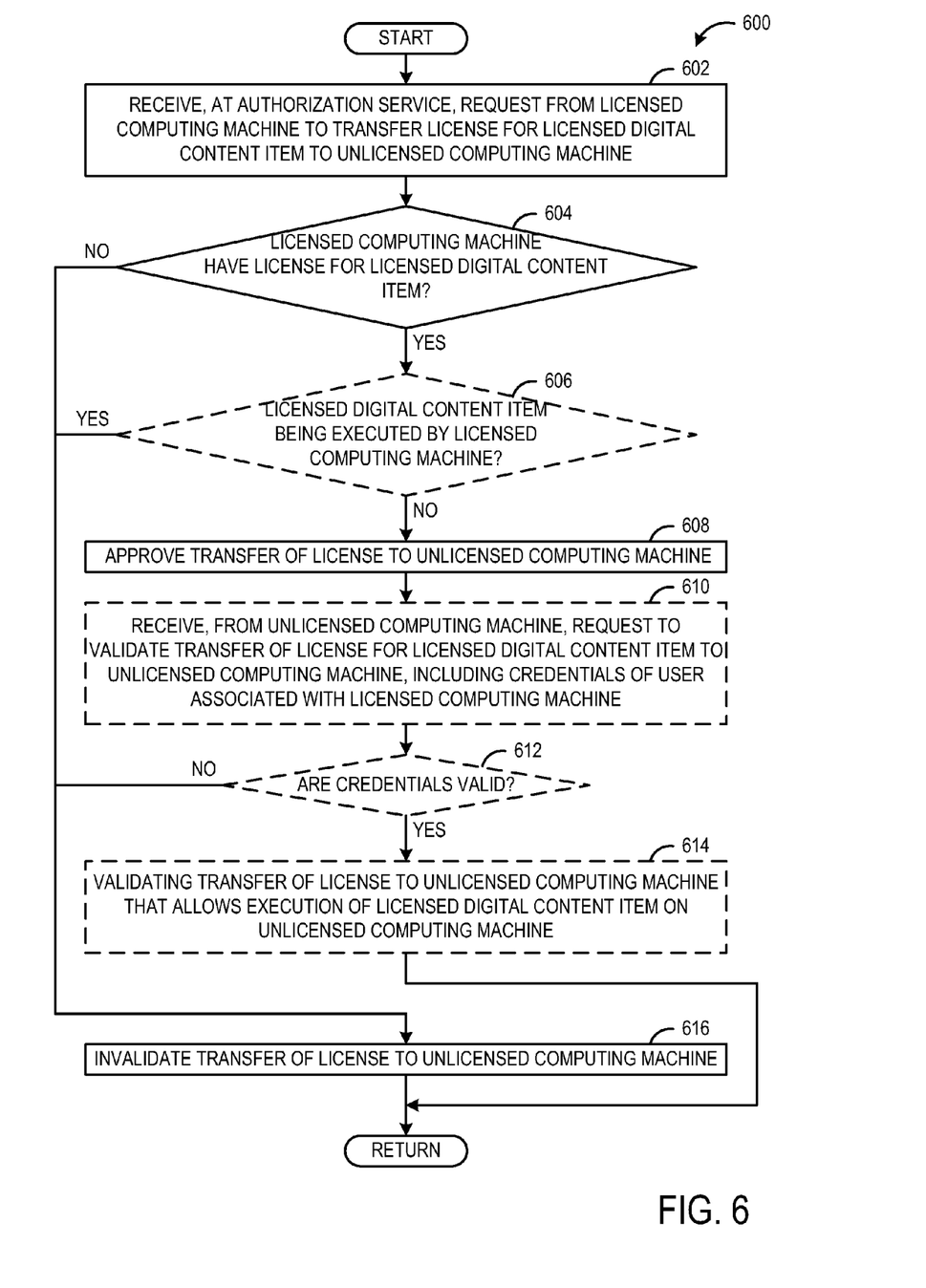
FIG. 6 shows a method of authorizing transfer of a license for a licensed digital content item between computing machines in accordance with an embodiment of the present disclosure.

FIG. 6 shows a method 600 of authorizing transfer of a license for a licensed digital content item between computing machines in accordance with an embodiment of the present disclosure. For example, the method 600 may be performed by the authorization service computing machine 120 shown in FIG. 1.

At 602, the method 600 may include receiving, at the authorization service computing machine, a request, from a licensed computing machine, to transfer a license for a licensed digital content item to an unlicensed computing machine.

At 604, the method 600 may include determining whether the licensed computing machine has a license for the licensed digital content item. In some embodiments, the request may include credentials of a user associated with the licensed computing machine, the license may be further associated with the credentials, and the method may include determining whether the user and the licensed computing machine have a license for the licensed digital content item. If the licensed computing machine item has a license for the licensed digital content, then the method 600 moves to 606. Otherwise, the method 600 moves to 616.

At 606, the method 600 may optionally include determining whether the licensed digital content item is being executed on the licensed computing machine. If it is determined that the licensed digital content item is being executed on the licensed computing machine, then the method 600 moves to 616. Otherwise, the method 600 moves to 608.

At 608, the method 600 may include approving transfer of the license for the licensed digital content item to the unlicensed computing machine. In some cases, the transfer of the license may be approved if the licensed computing machine has the license for the licensed digital content item and the licensed digital content item is not currently being executed on the licensed computing machine.

At 610, the method 600 may optionally include receiving, from the unlicensed computing machine, a request to validate transfer of the license for the licensed digital content item to the unlicensed computing machine. The request may include credentials of the user associated with the licensed computing machine. For example, this request may be sent to the authorization service if the terms of the license oblige the user to sign-in to the unlicensed computing machine. In other words, a user associated with the unlicensed computing machine may not execute the licensed digital content item without the user of the licensed computing machine being signed in to the unlicensed computing machine.

In some embodiments, the licensed digital content item may be executed on the unlicensed computing machine without validation of the transfer by the authorization service computing machine.

At 612, the method 600 may optionally include determining whether the credentials of the user are valid. If the credentials are valid, then the method 600 moves to 614. Otherwise, the method 600 moves to 616.

At 614, the method 600 may optionally include validating transfer of the license to the unlicensed computing machine that allows execution of the licensed digital content item on the unlicensed computing machine.

At 616, the method 600 may include invalidating transfer of the license for the licensed digital content item to the unlicensed computing machine that prevents execution of the licensed digital content item on the unlicensed computing machine. In some cases, the transfer may be invalidated if the licensed computing machine does not have a license for the licensed digital content item. In some cases, the transfer may be invalidated if the credentials of the user are invalid. In some cases, the transfer may be invalidated if the licensed digital content item is being executed on the licensed computing machine. In some cases, invalidating transfer includes denying a request to deliver the digital content item to the unlicensed computing machine.

The above described methods may facilitate a scenario where a user that has a license for a licensed digital content item may initiate remote installation of the licensed digital content item on an unlicensed computing machine that is remotely located from the user. While the user travels to the unlicensed computing machine, or at any other suitable time, the licensed digital content item may be delivered to and installed on the unlicensed computing machine. When the user arrives at the unlicensed computing machine, the licensed digital content item is ready to be executed. Accordingly, the user does not have to wait for the licensed digital content item to be delivered to and installed on the unlicensed computing machine. Moreover, the user does not have to bring a physical copy of the licensed digital content item to the unlicensed computing machine in order to install the licensed digital content item on the unlicensed computing machine. Further, the license for the licensed digital content item may be temporarily transferred so as to not violate terms of the license.

The above described scenario may be particularly applicable to relatively large digital content items that may take a substantial amount of time to deliver and install, such as video games. In some embodiments, the licensed digital content item may be a video game. In some embodiments, the licensed computing machine and the unlicensed computing machine may be game consoles. It is to be understood that transferring a license between the licensed computing machine and the unlicensed computing machine need not create a new license, and a total number of licenses need not change.

Figure 7:
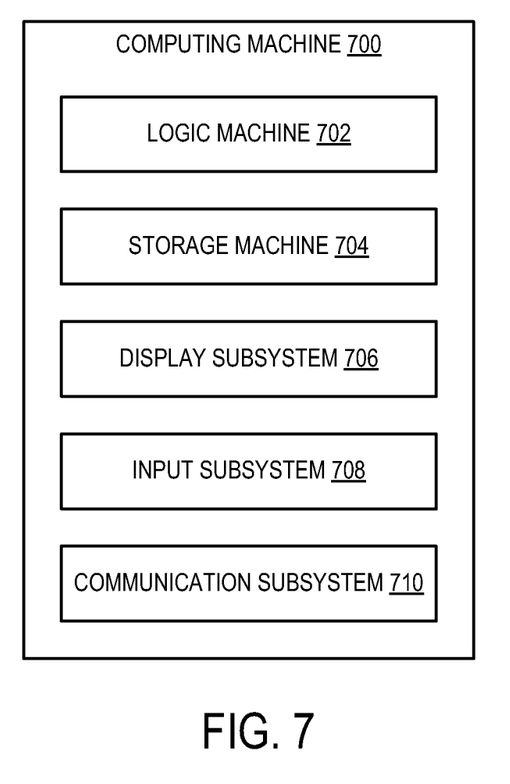
FIG. 7 schematically shows a computing system in accordance with an embodiment of the present disclosure.

FIG. 7 schematically shows a non-limiting embodiment of a computing system 700 that can enact one or more of the methods and processes described above. For example, computing system 700 may be representative of the licensed computing machine 102, the unlicensed computing machine 108, the CDN computing machine 116 or the authorization service computing machine 120 shown in FIG. 1. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, may be one or more application programs executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of initiating remote installation of a licensed digital content item, the method comprising:
receiving, at a licensed computing machine associated with a first user, a user input that identifies an unlicensed computing machine associated with a second user and not the first user at which to install the licensed digital content item;
responsive to receiving the user input, sending, from the licensed computing machine to an authorization service computing machine, a request to transfer a license for the licensed digital content item to the unlicensed computing machine; and responsive to receiving the user input, automatically initiating delivery of the licensed digital content item to the unlicensed computing machine for use of the licensed digital content item on the unlicensed computing machine, wherein execution of the licensed digital content item on the unlicensed computing machine is prevented while the licensed digital computing machine executes the licensed digital content item.

2. The method of claim 1, further comprising:
preventing the licensed digital content item from being executed on the licensed computing machine while the license is transferred to the unlicensed computing machine.

3. The method of claim 1, wherein identifying includes selecting the unlicensed computing machine from a plurality of unlicensed computing machines known to the user and not associated with the user.

4. The method of claim 1, wherein initiating delivery includes sending, to a content delivery network, a request to deliver the licensed digital content item to the unlicensed computing machine.

5. The method of claim 1, wherein initiating delivery includes delivering the licensed digital content item directly from the licensed computing machine to the unlicensed computing machine.

6. The method of claim 1, wherein initiating delivery includes sending, to one or more peer computing machines of a peer-to-peer network, a request to deliver at least a portion of the licensed digital content item to the unlicensed computing machine.

7. The method of claim 1, wherein the license is transferred to the unlicensed computing machine until a user associated with the licensed computing machine signs out of the unlicensed computing machine.

8. The method of claim 1, wherein the license is transferred to the unlicensed computing machine for a designated period and upon expiration of the designated period the license is transferred back to the licensed computing machine.

9. A method of acquiring a licensed digital content item, the method comprising:
receiving the licensed digital content item at an unlicensed computing machine identified via a user input received at a licensed computing machine, the unlicensed computing machine and the licensed computing machine associated with different users;
preventing execution of the licensed digital content item on the unlicensed computing machine if a license for the licensed digital content item is not validated as being transferred to the unlicensed computing machine;
allowing execution of the licensed digital content item on the unlicensed computing machine if the license for the licensed digital content item is validated as being transferred to the unlicensed computing machine; and
in response to receiving a notification that the licensed digital content item is being executed on the licensed computing machine, preventing execution of the licensed digital content item on the unlicensed computing machine.

10. The method of claim 9, wherein the license is transferred from the licensed computing machine.

11. The method of claim 9, wherein the license is validated by an authorization service computing machine that validates credentials received from the unlicensed computing machine for a user associated with the licensed computing machine.

12. The method of claim 9, further comprising:
providing an offer to obtain a license for the licensed digital content item; and
allowing execution of the licensed digital content item on the unlicensed computing machine responsive to the unlicensed computing machine obtaining the license for the licensed digital content item.

13. The method of claim 9, further comprising:
removing the licensed digital content item from the unlicensed computing machine if resources of a visitor cache of the unlicensed computing machine become designated for a different digital content item.

14. The method of claim 9, wherein the license is transferred from the unlicensed computing machine responsive to a user associated with the licensed computing machine signing out of the unlicensed computing machine.

15. A method of authorizing transfer of a license for a licensed digital content item, the method comprising:
receiving, at an authorization service computing machine, a request, from a licensed computing machine associated with a first user, to transfer the license for the licensed digital content item to an unlicensed computing machine identified via a user input received at the licensed computing machine, the unlicensed computing machine associated with a second user and not the first user;
approving transfer of the license for the licensed digital content item to the unlicensed computing machine if the licensed computing machine has the license for the licensed digital content item and the licensed digital content item is not being executed on the licensed computing machine;
receiving, at the authorization service computing machine, a request, from the unlicensed computing machine, to validate transfer of the license for the licensed digital content item to the unlicensed computing machine, the request including credentials of the first user associated with the licensed computing machine;
validating transfer of the license to the unlicensed computing machine that allows execution of the licensed digital content item on the unlicensed computing machine if the credentials of the first user are valid; and
preventing execution of the licensed digital content item on the unlicensed computing machine while the licensed digital content item is being executed on the licensed computing machine.

16. The method of claim 15, wherein the request is sent responsive to the user signing in to the unlicensed computing machine.

17. The method of claim 15, further comprising:
initiating delivery of the licensed digital content item to the unlicensed computing machine responsive to approving transfer of the license for the licensed digital content item to the unlicensed computing machine.

18. A licensed computing machine, comprising:
a logic machine; and
a storage machine holding instructions executable by the logic machine to:
receive, at the licensed computing machine associated with a first user, a user input that identifies an unlicensed computing machine associated with a second user and not the first user at which to install a licensed digital content item;
responsive to receiving the user input, send, from the licensed computing machine to an authorization service computing machine, a request to transfer a license for the licensed digital content item to the unlicensed computing machine; and responsive to receiving the user input, automatically initiate delivery of the licensed digital content item to the unlicensed computing machine for use of the licensed digital content item on the unlicensed computing machine, wherein execution of the licensed digital content item on the unlicensed computing machine is prevented while the licensed digital computing machine executes the licensed digital content item.

19. An authorization service computing machine, comprising:

a logic machine; and a storage machine holding instructions executable by the logic machine to:

receive, at the authorization service computing machine associated with a first user, a request, from a licensed computing machine, to transfer a license for a licensed digital content item to an unlicensed computing machine identified via a user input received at the licensed computing machine, the unlicensed computing machine associated with a second user and not the first user;

approve transfer of the license for the licensed digital content item to the unlicensed computing machine if the licensed computing machine has the license for the licensed digital content item and the licensed digital content item is not being executed on the licensed computing machine;

receive, at the authorization service computing machine, a request, from the unlicensed computing machine, to validate transfer of the license for the licensed digital content item to the unlicensed computing machine, the request including credentials of the first user associated with the licensed computing machine;

validate transfer of the license to the unlicensed computing machine that allows execution of the licensed digital content item on the unlicensed computing machine if the credentials of the first user are valid; and prevent execution of the licensed digital content item on the unlicensed computing machine while the licensed digital content item is being executed on the licensed computing machine.

\* \* \* \* \*